(12) United States Patent
Lorenz et al.

(10) Patent No.: US 8,966,840 B2
(45) Date of Patent: Mar. 3, 2015

(54) ARRANGEMENT FOR CLOSING AN OPENING IN A VEHICLE AND METHOD FOR PRODUCING SUCH AN ARRANGEMENT

(71) Applicants: Steffen Lorenz, Lech (DE); Andreas Lang, Gröbenzell (DE); Wolfgang Dittrich, Hofstetten (DE); Peter Reihl, München (DE); Bernhard Harnischfeger, Dachau (DE); Alexander Bergmiller, Königsbrunn (DE); Matthias Dichtl, Eurasburg (DE); Manuel Degenhardt, Diessen (DE); Michaela Nowak, München (DE); Guido Bott, München (DE)

(72) Inventors: Steffen Lorenz, Lech (DE); Andreas Lang, Gröbenzell (DE); Wolfgang Dittrich, Hofstetten (DE); Peter Reihl, München (DE); Bernhard Harnischfeger, Dachau (DE); Alexander Bergmiller, Königsbrunn (DE); Matthias Dichtl, Eurasburg (DE); Manuel Degenhardt, Diessen (DE); Michaela Nowak, München (DE); Guido Bott, München (DE)

(73) Assignee: Webasto SE, Stockdorf (DE)

( * ) Notice: Subject to any disclaimer, the term of this patent is extended or adjusted under 35 U.S.C. 154(b) by 0 days.

(21) Appl. No.: 13/866,889

(22) Filed: Apr. 19, 2013

(65) Prior Publication Data
US 2013/0283727 A1    Oct. 31, 2013

(30) Foreign Application Priority Data
Apr. 27, 2012   (DE) .......................... 10 2012 103 757

(51) Int. Cl.
*E06B 3/30*   (2006.01)
*B60J 1/20*   (2006.01)
*B60J 7/043*   (2006.01)
*B32B 37/14*   (2006.01)

(52) U.S. Cl.
CPC ................ *B60J 1/2094* (2013.01); *B60J 7/043* (2013.01); *B32B 37/14* (2013.01)
USPC .................... 52/204.53; 52/717.01; 52/717.03

(58) Field of Classification Search
CPC ............ B60J 1/20; B60J 1/2094; B60J 7/043; B32B 37/14
USPC .......... 52/202, 203, 204.53, 204.62, 204.591, 52/312, 717.01, 717.03, 797.1
See application file for complete search history.

(56) References Cited

U.S. PATENT DOCUMENTS

2005/0132661 A1 *   6/2005   Buerklen et al. ................ 52/202
2009/0151255 A1 *   6/2009   Haak et al. ......................... 49/9

FOREIGN PATENT DOCUMENTS

| DE | 4323140 A1 | 12/1994 |
|---|---|---|
| DE | 10151156 A1 | 5/2003 |
| DE | 102007009039 A1 | 8/2008 |
| EP | 2353907 A1 * | 8/2011 |
| WO | 2004073976 A1 | 9/2004 |
| WO | 2007003177 A1 | 1/2007 |

OTHER PUBLICATIONS

DE-Search / Examination Report.

* cited by examiner

*Primary Examiner* — Charles A Fox
*Assistant Examiner* — Patrick Maestri
(74) *Attorney, Agent, or Firm* — Fitch, Even, Tabin & Flannery, LLP

(57) ABSTRACT

An arrangement for closing an opening in a vehicle and method for producing such an arrangement. In an arrangement for closing an opening in a vehicle, comprising a pane and an anti-shatter film attached to the pane, in the border region of the pane, the pane and the anti-shatter file are provided with a foam encapsulation. The foam encapsulation is arranged at least particularly spaced apart from an edge of the anti-shatter film, which edge is formed on the pane.

8 Claims, 6 Drawing Sheets

ARRANGEMENT FOR CLOSING AN OPENING IN A VEHICLE AND METHOD FOR PRODUCING SUCH AN ARRANGEMENT

CROSS-REFERENCE TO RELATED APPLICATIONS

This Application claims priority from German Patent Application No.: DE 10 2012 103 757.4, filed Apr. 27, 2012, which is hereby incorporated herein by reference in its entirety for all purposes.

DESCRIPTION

Arrangement for closing an opening in a vehicle, and method for producing such an arrangement The present invention relates to an arrangement for closing an opening in a vehicle, said arrangement comprising a pane, and also to a method for producing such an arrangement.

DE 43 231 40 A1 discloses a pane arrangement for an adjustable cover of a vehicle roof, wherein the lower side of a glass pane is provided with a layer of amorphous silicon, and a transparent polyethylene terephthalate (PET) film is attached in the central region of the pane by means of an adhesive film. The border region of the PET film extends into a polyurethane foam encapsulation of the cover border, by means of which a cover inner panel is also attached to the lower side of the pane.

It is an object to specify an improved concept for an arrangement for closing an opening in a vehicle, comprising a pane and an anti-shatter film which ensure as good protection of the vehicle occupants and of the vehicle interior as possible in the event of the pane breaking.

This object is achieved by the subject matter of the independent patent claims. Developments and configurational forms are the subject matter of the dependent claims.

In the embodiments described below, an arrangement for closing an opening in a vehicle has a pane and an anti-shatter film attached to the pane. For example, the anti-shatter film is attached to the pane over the full area thereof. In the border region of the pane, the pane and the anti-shatter film are provided with a foam encapsulation. The improved concept is based on the idea that an undesirable detaching of the anti-shatter film from the pane can be prevented by an at least partial spacing between the foam encapsulation and an edge of the anti-shatter film, which edge is formed between the anti-shatter film and the pane. For example, such a spacing prevents gas emissions, for example $CO_2$, from the foam encapsulation, which is formed, for example, from polyurethane, from penetrating between the anti-shatter film and the pane and thus leading to the film being detached from the pane. Furthermore, by means of the spacing, there is less a transmission of forces between the foam encapsulation and the film, which, in the case of conventional arrangements, may lead to the film being detached in particular in the event of temperature fluctuations due to different temperature coefficients of the pane, anti-shatter film and foam encapsulation. Both a desired visual impression of the pane with the film and also the desired function of the film over the service life of the arrangement is therefore maintained by the spacing.

Accordingly, in one embodiment, the arrangement has spacing means by means of which the foam encapsulation is arranged at least partially spaced apart from an edge of the anti-shatter film, which edge is formed on the pane.

In various configurational forms of the arrangement, the border region of the anti-shatter film, which preferably does not extend as far as the respective border of the pane, is provided with holes, wherein, by means of this configuration, respective edges are formed both by the border of the film and by the inner border of the holes.

Furthermore, in various embodiments, a reinforcing element, in particular a holding element for connection to a vehicle body, such as, for example, a cover inner panel, can furthermore be provided. Such a reinforcing element is likewise enclosed here by the foam encapsulation.

In one configurational form, the edge which lies spaced apart from the foam encapsulation is formed by that border of holes of the anti-shatter film which faces the center of the pane. In this case, a border of the foam encapsulation, in particular the border facing the center of the pane, runs through the holes. Accordingly, in this embodiment, a gap is formed between the border of the form encapsulation and the edge of the anti-shatter film. This gap, for example, forms the spacing means.

In another configurational form, a shadow gap is provided in the border region of the foam encapsulation, in particular on the border facing the center of the pane. The edge of the anti-shatter film, which edge is formed by that border of holes of the anti-shatter film which faces the center of the pane, runs here below the shadow gap. Accordingly, in this embodiment, the spacing means comprise the described shadow gap.

In a further configurational form, the spacing means comprise a sealing band or a sealing compound which runs over the edge of the anti-shatter film. In various variations of this embodiment, the film can be configured here with or without holes. For example, in an embodiment with holes in the film, a sealing band has respective recesses which are arranged within the holes. It is thereby achieved, for example, that the foam encapsulation can be fixedly connected to the pane in the region of the recesses.

In a further configurational form, the border region of the anti-shatter film is in turn provided with holes, wherein the edge is formed by that border of the holes which faces the center of the pane. In this configurational form, the spacing means comprise a separating layer which is formed in particular with a separating means or a separating paint. The separating layer runs over the edge and is designed to reduce or to prevent adhesion of the foam encapsulation. For example, the separating layer in the region of the edge results in the formation of a gap between the anti-shatter film and the foam encapsulation, said gap firstly preventing gas emissions from entering under the anti-shatter film and secondly preventing a dynamic action of the foam encapsulation on the film because of thermal stresses. The separating layer preferably only partially covers the holes, and therefore, in turn, the foam encapsulation can undergo a fixed connection with the pane in the non-covered region of the holes and thus a desired protective function of the arrangement is achieved and maintained.

In a further configurational form with an anti-shatter film provided with holes in the border region, and with a reinforcing element foamed into the foam encapsulation, said reinforcing element has a first and a second sealing bead. The first sealing bead runs on that side of the holes which faces the center of the pane and therefore constitutes a seal on the anti-shatter film. The second sealing bead runs through the holes, and therefore the second sealing bead partially brings about a seal on the pane and partially on the film. A cavity which in particular is free from the foam encapsulation is formed by the first and the second sealing bead. Accordingly, in this embodiment, the spacing means have the cavity formed in this manner.

In a configurational form of a method for producing an arrangement for closing an opening in a vehicle, an anti-shatter film is attached to a pane. In the border region of the pane, the pane and the anti-shatter film are provided with a foam encapsulation. In this case, the foam encapsulation is arranged by means of spacing means to be at least partially spaced apart from an edge of the anti-shatter film, which edge is formed on the pane.

Configurational forms of this method emerge directly from the previously described embodiments of the arrangement.

In addition, the effect which is advantageously and desirably achieved in all of the previously described configurational forms is that, when the pane is broken, the splinters of the broken pane remain stuck to the anti-shatter film. Furthermore, as a result of the fact that the anti-shatter film is fixed in the border region by the foam encapsulation, the anti-shatter film, although the latter is no longer flexurally rigid when the pane is broken, is nevertheless held in situ by the foam encapsulation and/or a reinforcing element which is preferably provided. It can thereby be prevented that occupants are hurled outward through the broken pane, that objects and splinters can penetrate the interior from the outside through the broken pane or that the interior is freely accessible when the pane is destroyed in the event of a break-in.

The invention is explained in more detail below by way of a plurality of exemplary embodiments with reference to the figures. In this case, elements which are functionally identical or are identical in action bare the same reference numbers. If individual elements are described for one of the figures, the description thereof is not necessarily repeated in the following figures.

Figure 1:
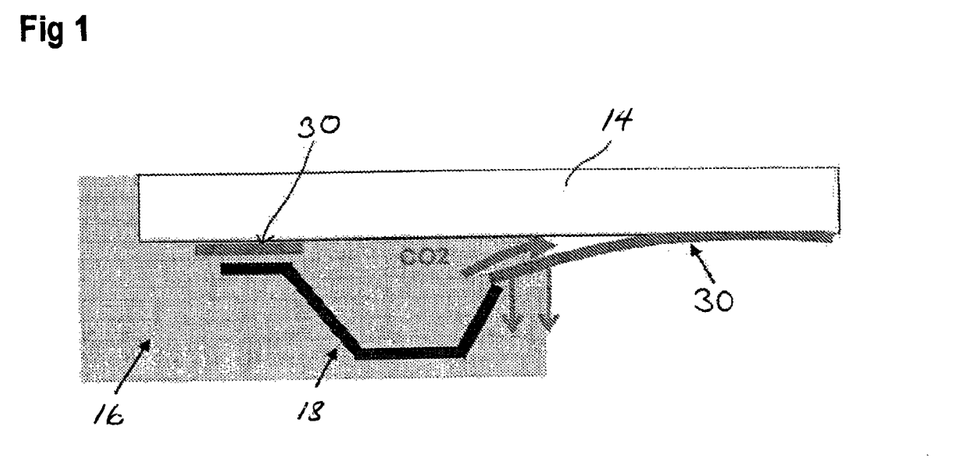
FIG. 1 shows a partial side view/section of an arrangement by way of example for closing an opening in a vehicle, comprising a pane and an anti-shatter film.

FIG. 1 shows a conventional arrangement for closing an opening in a vehicle, comprising a pane 14 and an anti-shatter film 30 attached to the pane 14 over the full area thereof. The anti-shatter film 30, together with a reinforcing element 18, which is designed, for example, as a holding element, is provided with a foam encapsulation 16 which in particular surrounds the entire border region of the pane 14 or of the arrangement. Although only a border region of the pane 14 is illustrated here, the border of the pane 14 is preferably completely foam-encapsulated in such arrangements. The foam encapsulation is formed, for example, by a polyurethane, PU foam. In the arrangement illustrated, an undesirable detachment of the film 30 from the pane 14, that is caused, for example, by a gas emission from the foam encapsulation 16, is shown. For example, by means of a subsequent reaction of the isocyanates, $CO_2$ is formed in the PU material, the $CO_2$ penetrating between the film 30 and pane 14 and therefore leading to the detachment of the anti-shatter film 30. In the conventional embodiment shown, the detachment is also assisted by the different thermal expansion coefficients of the pane 14, of the foam encapsulation 16 and of the film 30, since transverse forces occur here between the film 30, pane 14 and foam encapsulation 16.

In the embodiment illustrated in FIG. 1, but also in the embodiments described below, the anti-shatter film 30 can have holes in the border region thereof. This is illustrated, for example, in FIG. 2. The border region of the pane 14 or of the film 30, in which a plurality of holes 15 are illustrated, is shown here. The holes 15 have, for example, a rectangular shape with rounded corners. In the region of the holes 15, the foam encapsulation 16 can enter directly into contact with the pane 14, which leads to an improved transmission of force between the foam encapsulation 16 and the pane 14, but also to better fixing of the film 30 in the border region and in the foam encapsulation 16.

Figure 2:
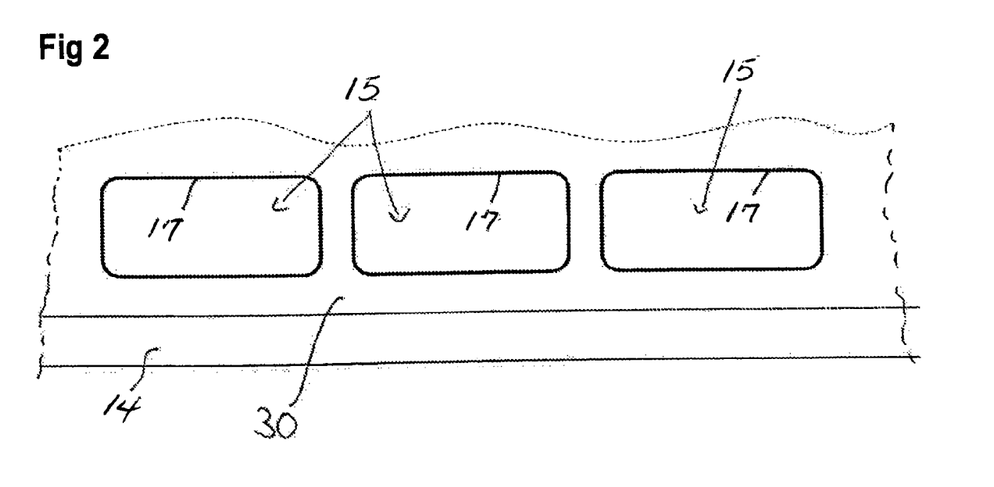
FIG. 2 shows a top view of an exemplary embodiment of a pane with an anti-shatter film attached over the full area.

With reference to the detachment of the film 30, that is illustrated in FIG. 1, those borders of the film 30 which face the center of the pane are identified in FIG. 2 as the edges 17 which primarily have a tendency to be detached in the conventional arrangement.

The figures illustrated below describe a plurality of measures, in which both the entry of gas emissions from the foam encapsulation 16 and a temperature-dependent transmission of force are reduced or even prevented by means of a spacing of the foam encapsulation 16 from at least this edge 17.

Figure 3A:
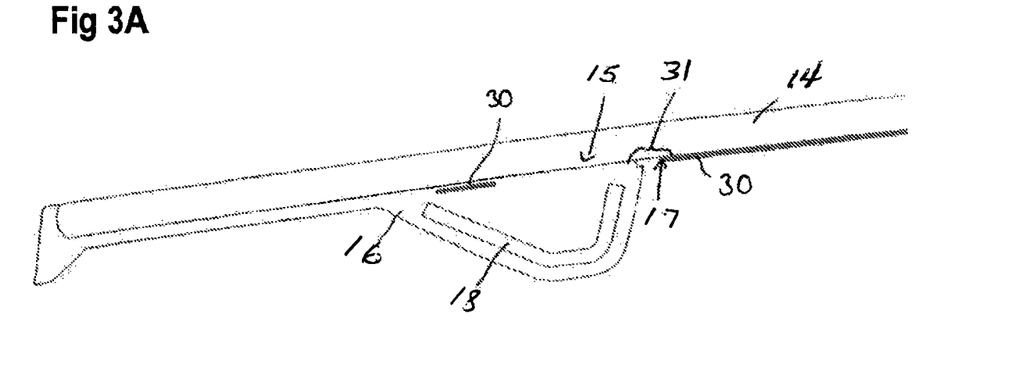
FIGS. 3A-3C show a side view/section of configurational forms of an embodiment of an arrangement according to the invention.
Figure 3B:
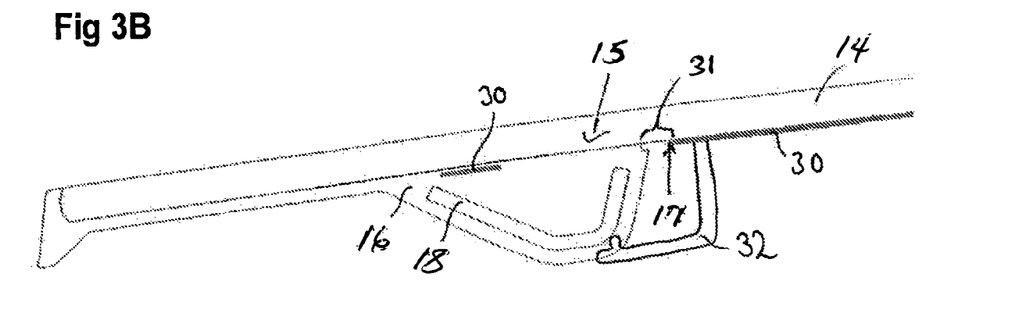
Figure 3C:
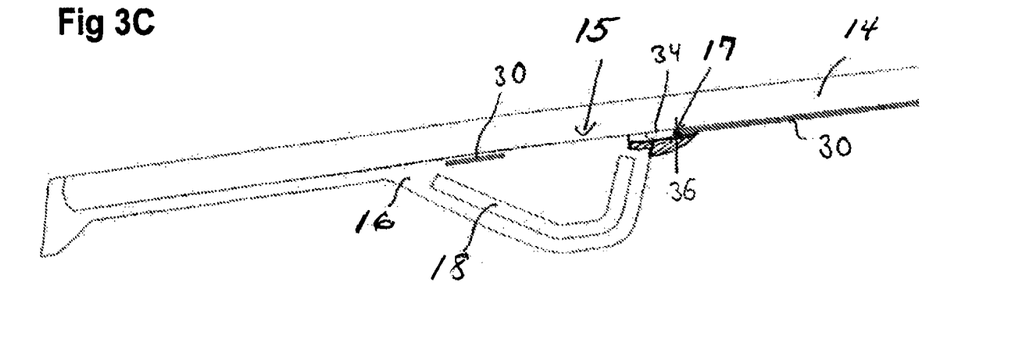

For this purpose, FIG. 3 shows various configurational forms of such an arrangement, in which the anti-shatter film 30 has the holes 15 illustrated in FIG. 2. In the embodiments illustrated in FIG. 3, the foam encapsulation is attached in such a manner that a border of the foam encapsulation 16, which border faces the center of the pane, runs longitudinally through the holes 15. As a result, a gap 31 is formed as spacing means between the anti-shatter film 30 and the foam encapsulation 16. By means of the presence of the gap 31, a gas emission from the foam encapsulation 16 is prevented from passing under the film 30 at the edge 17. This basic embodiment is illustrated in FIG. 3A.

In the case of the modification illustrated in FIG. 3B, a facing element 32 which extends from the foam encapsulation 16 over the anti-shatter film 30 and conceals the gap 31 is additionally provided. For example, the facing element 32 is formed by a panel clipped into the foam encapsulation 16. In addition, the facing element protects the edge 17 from further environmental influences and also provides visual protection such that occupants of the vehicle do not see the edge 17 and the gap 31.

In the modification illustrated in FIG. 3C, a profile piece 36 is provided over the edge 17, said profile piece being fixed to the pane 14, for example in the region of the hole 15, by means of an adhesive tape 34. The profile piece is subsequently partially enclosed during the production of the foam encapsulation 16. Alternatively, the profile piece 36 can also be placed directly into the foaming tool for producing the foam encapsulation 16 and thereby fixed in the arrangement during the encapsulating with foam. The profile piece 36 is formed, for example, from a plastic, such as ethylene-propylene-diene monomer, EPDM.

Figure 4:
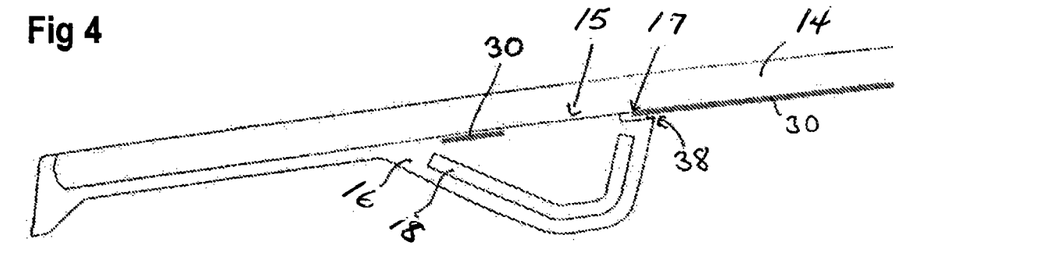
FIG. 4 shows a side view/section of a further embodiment of an arrangement according to the invention.

FIG. 4 shows a further embodiment of an arrangement according to the invention, in which a shadow gap 38 is provided in the foam encapsulation 16, on that border of the foam encapsulation 16 which faces the center of the pane. In particular, the foam encapsulation 16 is attached in such a manner that the edge 17 of the hole 15 runs within or below the shadow gap 38. The shadow gap 38 therefore constitutes a spacing means between the foam encapsulation 16 and the edge 17. Furthermore, by means of the shadow gap 38, the edge 17 is visually not visible from the interior of the vehicle, in which the arrangement according to the invention is installed.

Figure 5:
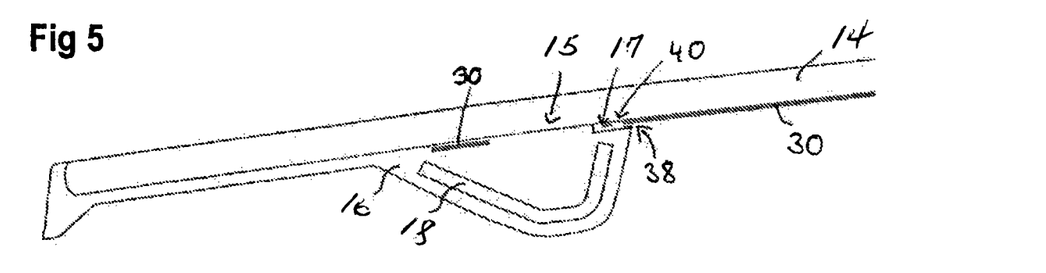
FIG. 5 shows a side view/section of a further embodiment of an arrangement according to the invention.

FIG. 5 shows a modification of the embodiment illustrated in FIG. 4, in which the film 30 is provided with a microperforation in the region of the edge 17 and within or below the shadow gap 38. The microperforation is formed, for example, by small points in the form of additional ventilation holes which are introduced into the film 30 by means of a laser, for example before a foaming operation. The individual points of the perforation 40 are arranged, for example, at a distance of approximately 1 mm from one another. The effect achieved by the microperforation is that, in the event that gas has entered under the edge 17, said gas can only migrate under the film 30 as far as the perforation 40 and then exits there.

Figure 6A:
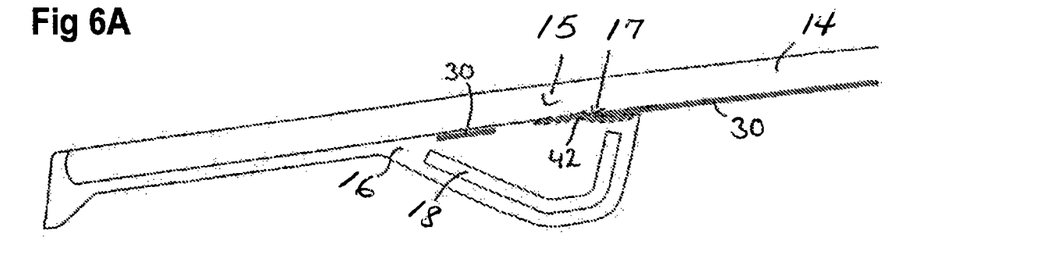
FIGS. 6A-6B show a side view/section of configurational forms of a further embodiment of an arrangement according to the invention.
Figure 6B:
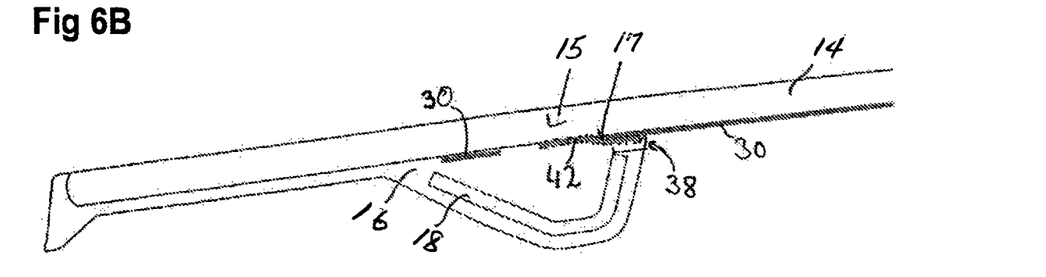

FIG. 6 shows a further configurational form of an arrangement according to the invention, in which the film 30 has the holes 15 illustrated in FIG. 2. In this embodiment, a sealing band 42 is provided here over the edge 17, said sealing band sealing the edge 17 and in particular a possible intermediate space between the film 30 and the pane 14 at the edge 17. Such a sealing band is designed, for example, as an aluminum band, as a Teflon band, as a PET band, as an ultra-high molecular weight polyethylene, a PE-UHMW band, as a foam band or the like. In addition, such a sealing band can be provided in the direction of the foam encapsulation 16 with an adhesion-reducing coating such that the adhesion between the foam encapsulation 16 and the sealing band 42 is reduced. As a result, the introduction of forces from the foam encapsulation 16 to the anti-shatter film 30 is reduced or prevented. Alternatively, the adhesion of the sealing band 42 to the pane 14 and to the film 30 can also be set in such a manner that the sealing band is detached from the film 30 in the event of a dynamic effect by the foam encapsulation 16. As a result, in turn, detachment of the film 30 from the pane 14 because of thermal stresses is prevented.

In the illustration of FIG. 6A, the described embodiment is designed in such a manner that the foam encapsulation 16 is extended onto the film 30 as far as the border region. In a similar manner as in the embodiments of FIG. 4 and FIG. 5, the embodiment illustrated in FIG. 6B is provided with a shadow gap 38 which brings about an additional spacing of the foam encapsulation 16 from the film 30.

Figure 7A:
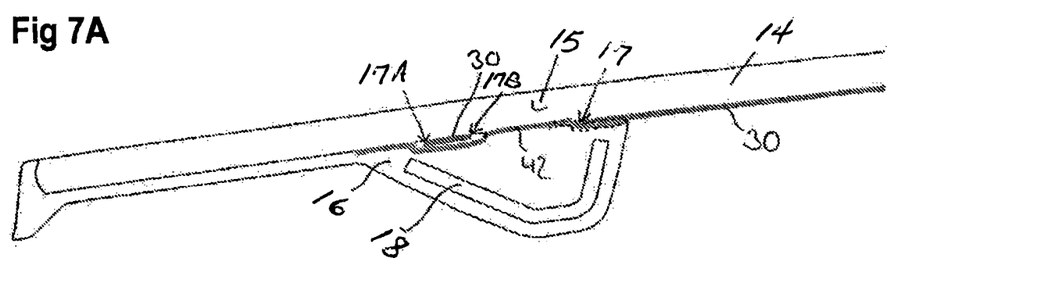
FIGS. 7A-7B show a side view/section of configurational forms of a further embodiment of an arrangement according to the invention.
Figure 7B:
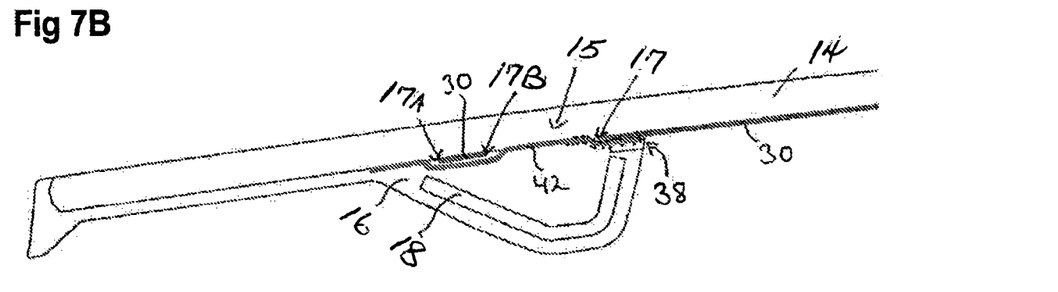

FIG. 7 illustrates a further embodiment of an arrangement according to the invention, in which, in a similar manner as in the embodiment of FIG. 6, a sealing band 42 is provided. FIG. 7A, in turn, illustrates an embodiment without a shadow gap and FIG. 7B illustrates an embodiment with a shadow gap 38.

In a departure from the embodiment of FIG. 6, in the embodiment of FIG. 7 the sealing band 42 also extends over the hole 15 and over that border of the anti-shatter film 30 which faces the border of the pane. As a result, the outer border 17A of the anti-shatter film and the entire inner border 17, 17B of the holes 15 are covered by the sealing band 42. As a result, the penetration of gas under the film 30 is prevented even better.

Figure 8A:
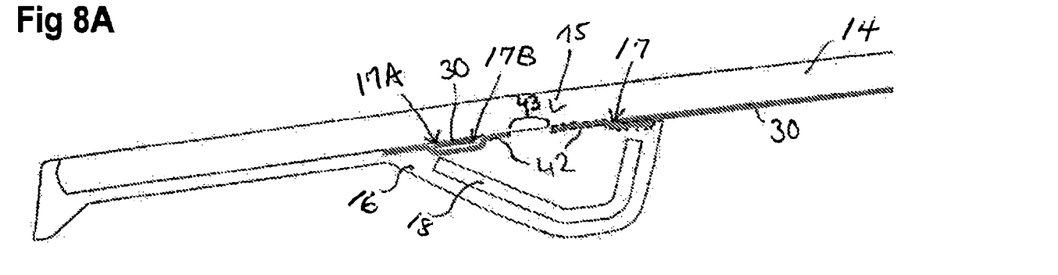
FIGS. 8A-8B show a side view/section of configurational forms of a further embodiment of an arrangement according to the invention.
Figure 8B:
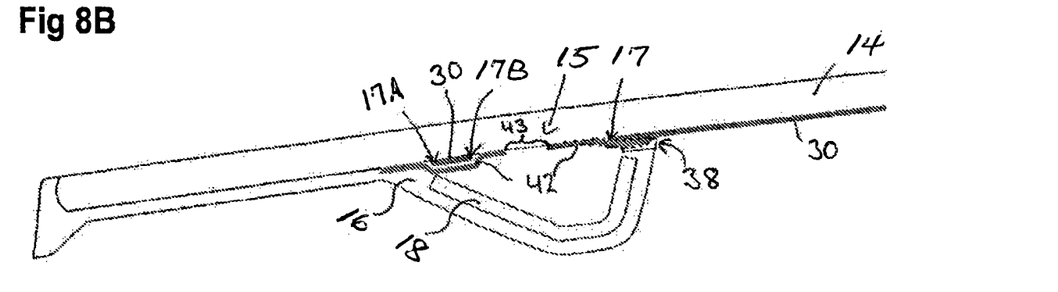

FIG. 8 shows a development of the embodiments illustrated in FIG. 7, wherein, in these embodiments, the sealing band 42 has additional recesses 43 in the region of the holes 15. In this embodiment, all of the edges 17, 17a, 17b are covered by the sealing band 42, wherein the foam encapsulation 16 can enter directly into contact with the pane 14 through the recess 43 and therefore a better connection to the pane 14 is produced.

Figure 9:
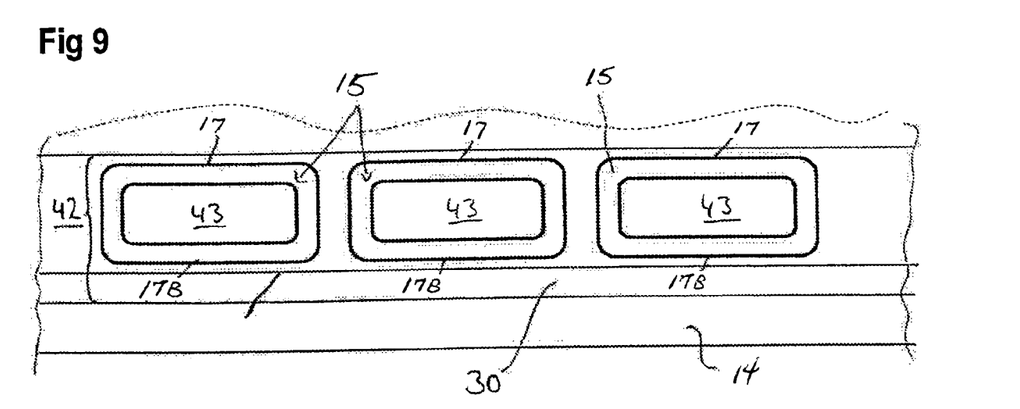
FIG. 9 shows a top view of the embodiment of the arrangement according to FIG. 8.

FIG. 9 shows a top view of the embodiment illustrated in FIG. 8, in which it is clear in particular how the recesses 43 of the sealing band 42 lie within the holes 15 of the anti-shatter film 30.

Figure 10:
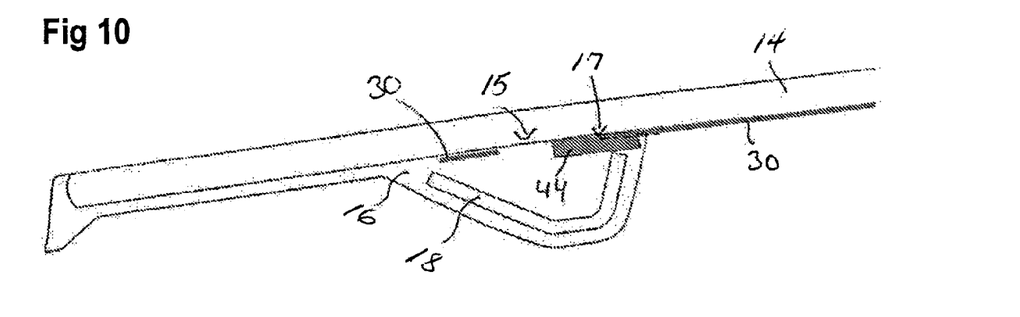
FIG. 10 shows a side view/section of a further embodiment of an arrangement according to the invention.

FIG. 10 shows a further embodiment of an arrangement according to the invention which is similar in particular to the embodiment illustrated in FIG. 6. In this case, instead of the sealing band 42 over the edge 17, a sealing compound 44 is provided. Such a sealing compound is applied to the edge 17 in particular before the foaming operation of the foam encapsulation 16. Such a sealing compound is based, for example, on a silicon, a polyurethane, in particular without gas emission of $CO_2$, a polymer-modified silane adhesive, a butyl or preferably an acrylate. As in the previously described exemplary embodiments, the effect which is advantageously achieved by the sealing compound 44 is that the entry of gases under the film 30 is prevented and, in addition, a transmission of force between the foam encapsulation 16 and film 30 is minimized.

Figure 11:
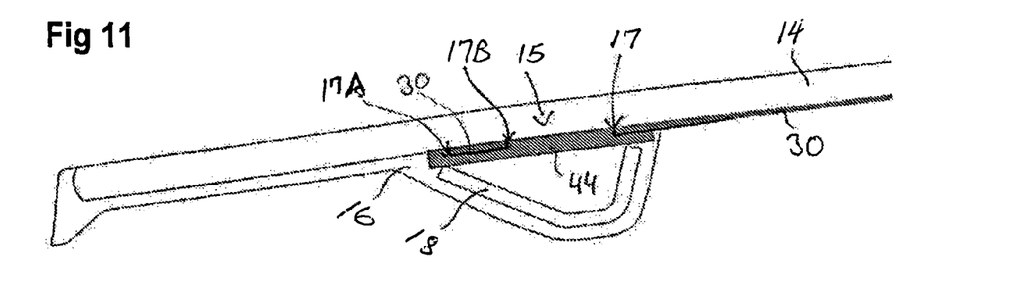
FIG. 11 shows a side view/section of a further embodiment of an arrangement according to the invention.

Building on the idea of FIG. 10, FIG. 11 shows a further embodiment of an arrangement according to the invention, in which the sealing compound 44 runs in turn over all of the edges 17, 17a, 17b of the anti-shatter film 30. The effect is comparable to that of the embodiment illustrated in FIG. 7. In addition, in a variation which is not illustrated here, the sealing compound 44 can also be applied to the film 30 in such a manner that recesses are in turn produced within the holes 15, as previously illustrated, for example in FIG. 8 and FIG. 9.

A shadow gap 38 can also be provided in the embodiments of FIG. 10 and FIG. 11.

Figure 12:
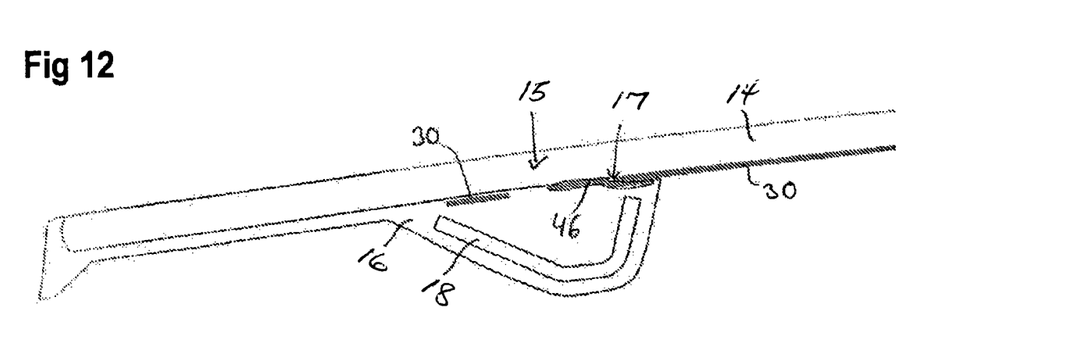
FIG. 12 shows a side view/section of a further embodiment of an arrangement according to the invention.

FIG. 12 shows a further embodiment of an arrangement according to the invention, in which a separating layer 46 is applied to the film 30 and over the edge 17. The separating layer 46 comprises in particular a separating means or a separating paint which is designed to reduce or to prevent adhesion of the foam encapsulation 16. In particular, the effect is thus achieved that no or virtually no transmission of force between the foam encapsulation 16 and the material located therebelow, i.e. pane 14 or film 30, is possible at the points at which the separating layer 46 is applied. In addition, a gap, in particular an air gap, is formed by the separating layer between the material located therebelow and the foam encapsulation 16 such that, in the event of a gas emission from the foam encapsulation 16, said gas emission can remain in the gap or can evaporate in another manner without penetrating under the film 30.

In the embodiment illustrated in FIG. 12, the separating layer 46 only partially covers the holes 15. As an alternative, in a similar manner as in the embodiments of FIG. 7, FIG. 8 and FIG. 11, all of the edges of the film 30 can also be covered by the separating layer 46.

Figure 13:
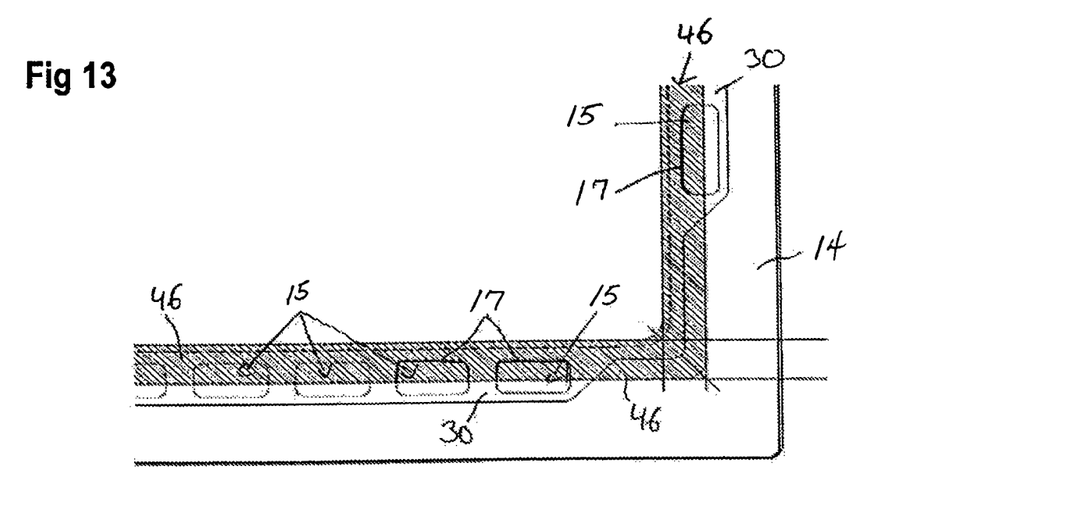
FIG. 13 shows a top view of the embodiment of the arrangement according to FIG. 12.

FIG. 13 shows a top view of a detail of a pane 14 with an anti-shatter film 30 and applied separating layer 46, corresponding to the embodiment of FIG. 12. It can be seen in this case that the separating layer 46 only partially extends over the holes 15, but in each case completely covers that edge 17 of the holes 15 which faces the center of the pane.

The previously illustrated embodiments are in each case illustrated with a reinforcing element 18 in the foam encapsulation 16. However, said reinforcing element can also be omitted in the embodiments described, and therefore only the pane 14 and the film 30 have the corresponding foam encapsulation 16.

Figure 14:
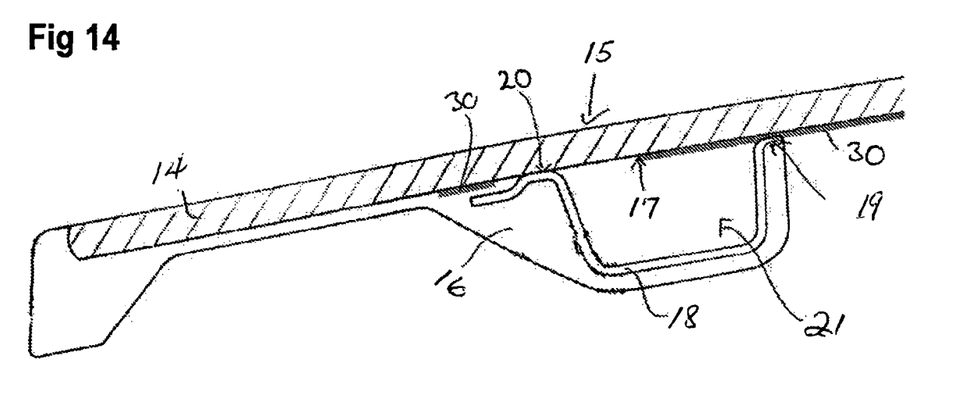
FIG. 14 shows a side view/section of a further embodiment of an arrangement according to the invention.

FIG. 14 shows a further embodiment of an arrangement according to the invention, in which a reinforcing element 18 of particular configuration is provided. Said reinforcing element has a first sealing bead 19 and a second sealing bead 20. The first sealing bead 19 runs on the foam 30 on that side of the holes 15 which faces the center of the pane. The second sealing bead 20 runs through the holes 15. The sealing beads 19 and 20 therefore produce at least a seal in relation to the material of the foam encapsulation such that, during the foaming operation of the foam encapsulation 16, a cavity 21, which is, for example, filled with air, is formed in the interior of the reinforcing element 18. In particular, said cavity 21 is free from the foam encapsulation 16. As a result, the effects of the entry of gas and the transmission of force to the film 30 are prevented by the foam encapsulation 16.

Modifications and a combination of the described embodiments are possible, of course, and are covered by the invention.

The invention claimed is:

1. An arrangement for closing an opening in a vehicle, comprising:
    a pane and an anti-shatter film attached to a portion of the pane;
    wherein in a border region of the pane, the pane and the anti-shatter film are provided with a foam encapsulation;
    the foam encapsulation is arranged at least partially spaced apart from an edge of the anti-shatter film, which edge of the anti-shatter film is formed on the pane,
    wherein as a result, a gap is formed as spacing between an edge of the anti-shatter film and the foam encapsulation in a direction normal to the surface of the pane.

2. The arrangement according to claim 1, in which the border region of the anti-shatter film is provided with holes, wherein the edge is formed by a border of the holes which faces the center of the pane, and wherein a portion of the foam encapsulation runs through the holes such that the gap is formed between the portion of the foam encapsulation and the edge.

3. The arrangement according to claim 2, furthermore comprising a facing element which extends from the foam encapsulation over the anti-shatter film and conceals the gap.

4. The arrangement according to claim 2, furthermore comprising a profile piece, which is arranged over the edge and is partially enclosed by the foam encapsulation.

5. The arrangement according to claim 1, in which the border region of the anti-shatter film is provided with holes, wherein the edge of the anti-shatter film is formed by a border of the holes which faces the center of the pane, and wherein the spacing comprises a separating layer, in particular with a separator or a separating paint, that runs over the edge of the anti-shatter film and is designed to reduce or to prevent adhesion of the foam encapsulation.

6. The arrangement according to claim 5, in which the separating layer only partially covers the holes.

7. The arrangement according to claim 1, furthermore comprising a reinforcing element, in particular a holding element for connection to a vehicle body, wherein the reinforcing element is enclosed by the foam encapsulation.

8. A method for producing an arrangement for closing an opening in a vehicle, comprising the steps of:
    attaching an anti-shatter film to a portion of the pane,
    providing, in a border region of the pane, a foam encapsulation to the pane and the anti-shatter film, and
    arranging the foam encapsulation at least partially spaced apart from an edge of the anti-shatter film, which edge of the anti-shatter film is formed on the pane, wherein as a result, a gap is formed as spacing between the edge of the anti-shatter film and the foam encapsulation in a direction normal to the surface of the pane.

* * * * *